INVENTOR,
FRANK STERN.
BY: Harry M. Saragovitz,
Edward J. Kelly,
Herbert Berl &
Julian C. Keppler
ATTORNEYS.

United States Patent Office 3,465,159
Patented Sept. 2, 1969

3,465,159

LIGHT AMPLIFYING DEVICE

Frank Stern, Pleasantville, N.Y., assignor, by mesne assignments, to the United States of America as represented by the Secretary of the Army Filed June 27, 1966, Ser. No. 561,677
Int. Cl. H01j *31/50*
U.S. Cl. 250—213 11 Claims

ABSTRACT OF THE DISCLOSURE

A light guiding structure for interconnecting a light source and a light receiver located on a substrate by means of a light channel located on said substrate for providing light gain along the path of said structure. The device includes a light guiding member associated with the substrate and includes a forward biased electroluminescent diode which may include a substrate of one conductivity type material, a layer of semiconductor material of the opposite conductivity type and, in some instances, an intermediate layer of material of one of said conductivity types which is doped much less heavily than the other layer of material of the same conductivity type. The light guiding member may be designed to have any contour and any number of inputs and outputs.

This invention relates to a light amplifier and light guiding structure capable of propagating light along the path of said structure from a source to any desired location and for amplifying the intensity of the light along said path, and to a device having one or more input paths and multiple output paths wherein the intensity of light propagated from an input light source along said separate output paths can be selectively and individually controlled.

The device according to the invention provides means for connecting a light source and a light receiver located on a surface by means of a light channel located on the same surface. The device includes a light guiding member (or light guide) associated with a substrate and includes a forward biased electroluminescent diode which may include a substrate of one conductivity type material and a layer of semiconductive material of the opposite conductivity type; in some instances, the device also includes an intermediate layer of material of one of said conductivity types which is doped much less heavily than the other layer of material of the same conductivity type. The device further includes a pair of metallic contacts or electrodes, one of which serves also as a light reflector. The light guide may be designed to have any desired contour, provided one avoids the use of extremely sharp bends, and thus may go around bends and pass obstacles that lie in a direct path between light source and receiver.

When a forward current from a unidirectional current source is passed through the p-n junction formed by said layer or layers and said substrate, electron-hole recombination occurs and, if the current is sufficiently large, spontaneous emission of light will be accompanied by a net gain along the light guide and a light signal introduced at one end of the light guide will be amplified. The operating current in such a device is kept at a level sufficiently low to prevent lasing. The substrate and light guiding member can be made of semiconducting materials such as galium arsenide, indium arsenide, indium phosphide, gallium antimonide, indium antimonide, lead sulfide, lead selenide, or lead telluride, or alloys of such semiconductors, or any other elementary or compound semiconductors alloys capable of amplifying light. Owing to the reflecting electrode and to the relatively high index of refraction of such materials as gallium arsenide, the light is strongly guided in the light guide and light is transmitted around bends in the light guide. The gain in the light guide can be controlled by adjusting the current flowing through the p-n junction. Because of the controllable gain feature of the light guide, the latter may have several output branches with the light amplification in, and hence, the output level from, each branch being controlled individual by separate current controlling means in each branch. Similarly, the device could have several input branches, also with controlled amplification.

The term "light," as used herein, refers to electromagnetic radiation in the infrared, visible, or ultraviolet regions of the spectrum.

An object of the invention is to provide means for confining the propagation of an input light signal to a predetermined path or paths and simulataneously to achieve amplification of said light signal during said propagation.

Another object of the invention is to provide means for readily propagating a light signal along a path the contour of which is not straight.

A further object of the invention is to provide means for directing an input light signal along a plurality of discrete paths and to control individually the light amplification in each of said paths.

The above objects and other objects and advantages of the invention will become apparent from the description of certain embodiments of the invention and from the accompanying drawings, wherein.

Figures 1, 2, 3, 4, 6:
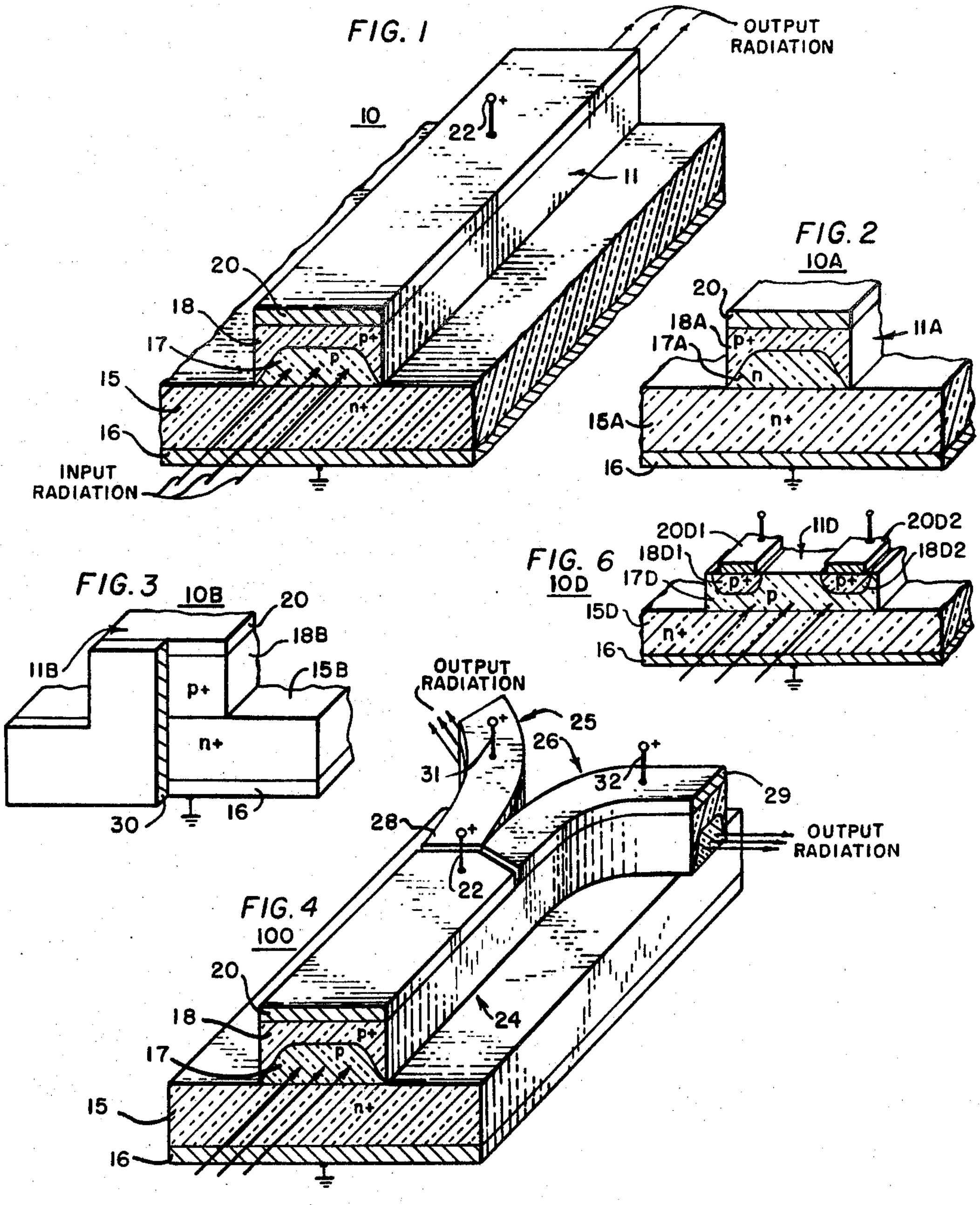
FIG. 1 is a view in cross-section, showing a light guide amplifier device according to the invention.
FIG. 2 is a fragmentary cross-sectional view showing an alternative arrangement of conductivity type layers to that shown in FIG. 1.
FIG. 3 is a fragmentary view showing another modification of the conductivity type layer structure of FIG. 1 wherein the intermediate layer overlying the substrate is removed.
FIG. 4 is a view, in cross-section, showing a device similar to that of FIG. 1 with multiple output branches of separately controllable gain.
FIG. 6 is a fragmentary view showing the possibility of multiple input light guiding portions.

In the device of FIG. 1, light from the light source is directed, as shown by arrows, labeled "Input Radiation," onto one end of the light guide amplifier 10 and is transmitted to the other end thereof, where it emanates as shown by the arrows labeled "Output Radiation" at increased amplitude and is applied to some desired output means, receiver, or sink, not shown. The light amplifier 10 is suitable for interconnecting optical and optoelectronic devices in integrated circuitry.

The light amplifier 10 of FIG. 1 basically is a three-layer semi-conductive structure which may use gallium arsenide as the host. The light amplifier 10 comprises a substrate 15 of moderately to heavily doped n-type conductivity material with an electrode 16 contacting one major surface thereof. The light guiding member 11 includes a lightly doped p-type region 17, formed as by diffusion or epitaxy, joining the n-type substrate 15 and a heavily doped p-type region 18 formed adjoining the p-type region 17, and an electrode 20 affixed to the surface of p-type region 18. Lightly doped p-type middle layer 17 may be doped to a level of the order of $10^{17}$ to $3\times10^{18}$ acceptors per cubic centimeter and a thickness of about 1 to 5 microns. The thickness of region 17 is related to the doping level, that is, the lighter the doping, the thicker can be the region 17 without excessive loss. Heavily doped p-type layer 18 preferably is quite thin, being of the order of a few microns or less, in order to cut down losses. Region 18 has a typical doping of about $10^{19}$ acceptors per cubic centimeter or greater. The donor level of substrate 15 is not too critical and values from $10^{18}$ per cubic centimeter to $10^{19}$ per cubic centimeter are satisfactory.

The intensity distribution normal to the junction of injection type electroluminescent device depends upon the boundary conditions imposed by the index of refraction and the absorption coefficient of the adjacent layers and the light emitting properties can be changed by altering these parameters. By using a three-layer semiconductor arrangement 15, 17, 18, as shown in either FIGS. 1 or 2, the radiation can more easily be confined to the active region 17 and the internal losses reduced as compared with the case where the minority carriers are injected into a homogeneous or graded region, such as shown in FIG. 3. A wider active region 17 provides a narrower beam spread perpendicular to the junction plane; this may be achieved by reducing the concentration in active layer 17 to provide a minority carrier diffusion length approximately equal to the width of the active region.

Both p-type region 17 and p++-type region 18 of FIG. 1 may be prepared either by diffusion or by an epitaxial process. The metallic electrodes 16 and 20 may be deposited according to any of the usual techniques, such as evaporation or sputtering. Electrode 20 is connected to a positive power supply terminal 22 by way of a lead bonded to the electrode 20, while electrode 20 is maintained at a negative potential (ground is shown in the figures of the drawing). In this manner, the diode is forward biased.

By terminating the ends of the device 10 with coatings having low reflectivity, the current through the junction can be increased without exceeding the threshold current for laser action. Such a coating 30 is shown in FIG. 3 and may be used with all of the embodiments shown in the drawing.

A typical thickness of the substrate is about 100 microns, although smaller or larger values may be chosen, depending on the required resistance values and the required mechanical stability. The lateral extent of the substrate depends on the number of devices and elements which are to be placed on it, and can range from the order of one-tenth of a millimeter to about 30 millimeters or more. The width of each light guiding channel can be of the order of 5 to 25 microns.

An alternative three-layer light amplifier 10A is shown in FIG. 2 wherein the light guide 11A includes an n+ substrate 15A, the lightly doped n-type region 17A and a heavily doped p-type region 18A, as well as electrodes 16 and 20. The lightly doped n-type region 17A has a donor concentration of about $3\times10^{16}$ per cubic centimeter but can be higher; the thickness of region 17A is related to the doping level and is of the order of a few microns to over 10 microns and the width is typically of the order of 5 to 25 microns. Heavily doped p-type layer 18A preferably is quite thin, as in the device of FIG. 1, to keep losses to a minimum and has a typical doping of about $10^{19}$ acceptors per cubic centimeter or greater to obtain hole injection into the lightly doped n-type region 17A. The donor level and size of substrate 15A is about the same as that of substrate 15 of FIG. 1.

As previously mentioned, it is possible, in some instances, to dispense with the separate middle layer 17 of FIG. 1 or the middle layer 17A of FIG. 2. Such a light guide 10B is shown in FIG. 3 wherein the light guide 11B includes the n-type substrate 15B and p-type layer 18B. The p-n junction of FIG. 3 can be prepared by epitaxial growth, with or without subsequent heat treatment, or by diffusion.

In all the structures shown in FIGS. 1–3, the light guide feature of the structure is retained by keeping the width of the junction narrow, say 25 microns or less, and by allowing for bends in its profile on the surface.

Figure 5:
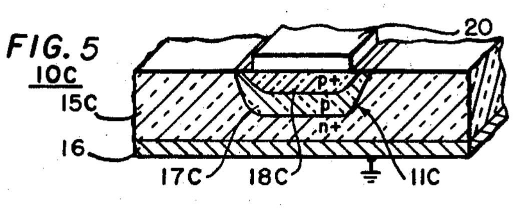
FIG. 5 is a view, in cross-section, of a light amplifier in which the light guiding portions lie substantially entirely within the substrate.

In FIG. 4, a device is shown having multiple outputs; two such outputs are shown by way of example although more than two output paths may be used, as needed. The light guide 11 in the device of FIG. 4 includes an input section 24 which may be of more or less linear configuration and which is split into two curved output portions 25 and 26 which may be directed to separate output devices or sinks, not shown. Separate electrodes 28 and 29 are provided for each output portion of the light amplifier device 100 so that a separate control current can be applied to each output portion. For example, if the direct current voltage supplied to positive terminal 31 is increased, the direct current in output section 25 is increased and light amplification along output portion or branch 25 is increased, and vice versa. Similarly, if the direct current voltage supplied to positive terminal 32 is increased, the consequent increased direct current in output section 26 increases the light gain of branch 26, and vice versa. In this manner, individual control of the gain of each output can be achieved at will. The device of FIG. 4 can also be constructed with a single layer, in the manner shown in FIG. 3, with an n+ middle layer, as shown in FIG. 2, or of the recessed type, such as shown in FIG. 5 and described subsequently. Instead of, or in addition to, multiple outputs, as in FIG. 4, the device could also have multiple inputs with similar features.

In the devices previously described, the light guide is shown as rising above the surface of the substrate portion. It is possible for this portion of the light guide amplifier to be fully or partially below the surface of the substrate, depending on the technique used in fabrication. As shown by way of example in FIG. 5, a p-type layer 17C may be back-filled by an epitaxial process within a trough etched in an n+ substrate 15C. A region 18C of p+ material then may be either diffused into the p-type layer 17C or deposited on the p-type layer 17C by epitaxy. The electrode 20 of FIG. 5 is substantially on the same plane as the upper surface of substrate 15C, although this need not always be the case. This recessed type of light guide amplifier also can be made with an n-type middle region in the manner of FIG. 2, instead of with the p-type middle region, or can be made with the dual layer structure shown in FIG. 3.

Any of the devices of FIGS. 1–5 may be modified to include multiple input portions upon which the input radiation impinges. Such a modification, having two input branches, by way of example, is shown in FIG. 6. The device of FIG. 6, of which only a portion is shown, includes a light guiding member 11D elevated above the substrate, similar to that shown in the devices of FIGS. 1–4, although it may be of recessed construction, as in the device of FIG. 5. The device of FIG. 6 includes a substrate 15D and the light guiding member 11D includes a p-type region 17D and a separate p+ type regions 18D1 and 18D2. Separate electrodes 20D1 and 20D2 are disposed in contact with regions 18D1 and 18D2, respectively. These electrodes may be connected to separate control potential terminals to provide individual control of the gain in the two portions of the light guiding member 11D. Although the device shown in FIG. 6 has the same n+pp+ structure as in the devices of FIGS. 1 and 4, the solid state structure may be similar to that shown in devices of FIGS. 2 and 3.

What is claimed is:

1. In a light amplifier device receptive of input light from a light source and having at least one output portion from which output light is derived, a solid state substrate of a first electrical conductivity type, an elongated solid state light guiding member of a material having a different electrical conductivity type from that of said substrate, said substrate and light guiding member forming a p-n junction, a light reflecting electrode adjoining a surface of said light guiding member, and a current source for forward biasing said junction to a value less than the lasing threshold, the light gain attained during passage through said device being a function of the magnitude of the biasing current from said current source.

2. A light amplifying device according to claim 1 wherein the said light guiding member is formed of a material of high index of refraction.

3. A light amplifying device according to claim 1 wherein said light guiding member includes a plurality of output branches each having separate electrode and biasing means for inidividually controlling the amplification of light through the corresponding branch.

4. A light amplifying device according to claim 3 wherein said light guiding member further includes a plurality of input branches.

5. A light amplifying device according to claim 1 wherein said light amplifier device has a low reflectivity coating at the ends thereof.

6. A light amplifying device according to claim 1 wherein said light guiding member includes a p-conductivity type layer and a p+-conductivity type layer and said substrate is of n+-type conductivity type.

7. A light amplifying device according to claim 1 wherein said light guiding member includes an n-conductivity type layer and a p+-conductivity type layer and said substrate is of n+-conductivity type.

8. A light amplifying device according to claim 1 wherein said light guiding member is positioned on a major surface of said substrate.

9. A light amplifying device according to claim 1 wherein said light guiding member is at least partially recessed within said substrate.

10. A light amplifying device according to claim 1 wherein said substrate and light guiding member are composed of a semiconducting material capable of amplifying light.

11. A light amplifying device according to claim 1 wherein said substrate is of one electrical conductivity type and wherein said light guiding member includes a first region of the opposite electrical conductivity type and a second region of one of said conductivity types which is doped much less heavily than the other region of the same conductivity type.

References Cited

Crowe et al.: "Applied Physics Letters," Feb. 1, 1964, pp. 57–58.

F. Stern: "IBM Technical Disclosure Bulletin," vol. 8, No. 1, June 1965, pp. 132–133.

ROY LAKE, Primary Examiner

DARWIN R. HOSTETTER, Assistant Examiner

U.S. Cl. X.R.

250—211, 217, 227; 330—4.3; 350—96